US006386345B1

United States Patent
Hamilton et al.

(10) Patent No.: US 6,386,345 B1
(45) Date of Patent: May 14, 2002

(54) CONTROLLING MOVEMENT OF A SEAT IN A VEHICLE

(75) Inventors: Brian K. Hamilton, Littleton; Brent A. Parks, Englewood, both of CO (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/644,314

(22) Filed: Aug. 23, 2000

(51) Int. Cl.$^7$ .............................. B60N 2/42
(52) U.S. Cl. ................. 188/276; 188/277; 297/216.1; 297/216.13
(58) Field of Search ................ 297/216.13, 216.14, 297/216.1; 188/276, 277

(56) References Cited

U.S. PATENT DOCUMENTS

| | | | |
|---|---|---|---|
| 3,111,133 A | 11/1963 | Fulton et al. ................. 137/68 |
| 3,260,272 A | 7/1966 | Eckhardt ..................... 137/68 |
| 3,533,658 A | * 10/1970 | Gropp et al. ............... 297/355 |
| 3,951,429 A | 4/1976 | Satzinger .................... 280/727 |
| 3,958,812 A | 5/1976 | Satzinger .................... 280/746 |
| 3,961,805 A | 6/1976 | Satzinger .................... 280/747 |
| 3,992,046 A | 11/1976 | Braess ...................... 296/65 A |
| 4,090,580 A | * 5/1978 | McLennan ............. 180/103 BF |
| 4,676,333 A | * 6/1987 | Merz ......................... 180/132 |
| 5,290,089 A | 3/1994 | Oleszko et al. ......... 297/216.14 |
| 5,310,030 A | 5/1994 | Kawakita et al. ........... 188/371 |
| 5,468,053 A | 11/1995 | Thompson et al. ......... 297/472 |
| 5,520,440 A | 5/1996 | Lee ....................... 297/378.12 |
| 5,538,117 A | 7/1996 | Bouchez ..................... 188/371 |
| 5,626,203 A | * 5/1997 | Habib ........................ 180/274 |
| 5,636,424 A | 6/1997 | Singer et al. ............. 29/407.01 |
| 5,676,421 A | 10/1997 | Brodsky ................. 297/216.13 |
| 5,743,591 A | * 4/1998 | Tame ....................... 297/216.1 |
| 5,772,280 A | 6/1998 | Massara ................. 297/216.12 |
| 5,779,312 A | 7/1998 | Nagai et al. ........... 297/362.13 |
| 5,806,891 A | 9/1998 | Pokhis ...................... 280/801.1 |
| 5,857,647 A | * 1/1999 | Jakubowski, Jr. ......... 244/137.4 |
| 5,863,066 A | * 1/1999 | Blumenthal ................. 280/737 |
| 6,076,887 A | * 6/2000 | Andersson ............... 297/216.1 |

FOREIGN PATENT DOCUMENTS

| | | | | |
|---|---|---|---|---|
| EP | 0 878 348 B1 | 11/1998 | ............ B60N/2/42 |
| WO | WO-9728982 A1 | * 8/1997 | |

* cited by examiner

*Primary Examiner*—Christopher P. Schwartz
*Assistant Examiner*—Melody M. Burch
(74) *Attorney, Agent, or Firm*—Sheridan Ross P.C.

(57) ABSTRACT

A control assembly for use in regulating movement of a vehicle seat back is provided. The control assembly uses damping fluid to regulate the degree of damping applied to the seat back. The control assembly includes one or more initiator assemblies. A selected one or more of them can be activated when a front and/or rear end collision occurs. When an initiator assembly is activated, a transfer member changes between closed and open states to regulate a path for damping fluid. The control assembly also includes a piston head having first and second sides. Movement of the damping fluid occurs relative to these two sides. The piston head can include at least one bore, which functions as an additional path for damping fluid. The control assembly preferably also includes a temperature compensation assembly to accommodate temperature changes in the damping fluid.

22 Claims, 5 Drawing Sheets

CONTROLLING MOVEMENT OF A SEAT IN A VEHICLE

FIELD OF THE INVENTION

The present invention relates to regulating movement of a seat back assembly in a vehicle and, in particular, to controlling movement of a seat back assembly using one or more initiator assemblies.

BACKGROUND OF THE INVENTION

Numerous vehicle safety systems have been advanced and used in protecting the occupants in the vehicle when a collision occurs. Air bag modules that inflate when activated using inflators have been integrated with vehicles to safeguard the driver and/or passenger(s). Seat belt pretensionors have also been devised that activate under vehicle collision conditions. Additionally, vehicle seats have included mechanisms that control movement of the seat back, particularly when the vehicle is subject to a front or rear end collision.

In conjunction with seat back assemblies, it is desirable to dampen their movement in a predetermined manner in order to reduce the severity of an injury to a vehicle occupant including whiplash injuries. Because of the potential seriousness of head, neck and back injuries that can result from front and rear end collisions, it would be beneficial to provide a system in the vehicle that functions effectively to regulate seat back movement when these types of collisions occur. As part of such a vehicle system, a mechanical control assembly is necessary to properly regulate seat back movement. It would be advantageous to provide such a control assembly that is also relatively easily to manufacture, has a limited number of parts and can be produced at a competitive cost.

SUMMARY OF THE INVENTION

In accordance with the present invention, apparatus and method are provided for controlling movement of a seat back in a vehicle using a control assembly that includes at least a first initiator assembly. The control assembly is operably connected to a seat back assembly associated with the vehicle seat including back. When a front or rear end collision occurs that exceeds a predetermined threshold, the control assembly can be activated to regulate movement of the seat back.

In a preferred embodiment, the control assembly includes a piston assembly that is operably connected to the seat back assembly. The piston assembly includes parts that controllably change position in connection with causing the seat back to move when a collision occurs. The piston assembly includes a housing having a chamber for containing damping fluid. The piston assembly also includes the piston head and a shaft connected thereto. The diameter or width of the piston head is substantially the same as the inner diameter of the chamber. Preferably, one or more sealing members or rings are located outwardly of the circumference of or periphery of the piston head and engage the inner wall of the housing. In one embodiment, the piston head includes at least one bore or hole that extends through the piston head. The bore permits damping fluid to move between opposing sides of the piston head. The shaft extends from one of the sides of the piston head and can extend outwardly from the housing to, directly or indirectly, operably connect to the seat back movement assembly.

The control assembly also includes a transfer assembly comprising a number of parts or sections, which are involved in transferring damping fluid from one side of the piston head to the other side, depending upon whether or not a front end or rear end collision has occurred, when the control assembly is activated. The transfer assembly includes at least a first transfer member that can be defined as including first and second transfer member sections and a juncture therebetween. The juncture has two states, namely, an open state and a closed state. In one of these two states, the control assembly is activated and, in the other of the two states, the control assembly is unactivated. In one embodiment, in the closed state of the juncture, the control assembly is unactivated and the juncture changes to the open state, after the control assembly has been activated. In regard to this one embodiment, this juncture is caused to open or change from the closed state to the open state using a first initiator assembly. The initiator assembly is triggered or activated by one or more electrical signals from a vehicle control system. The vehicle control system is involved with determining that a vehicle collision has occurred which is sufficient to cause activation of the first initiator assembly. In one embodiment, when the first initiator assembly is activated, an explosive charge is ignited that results in movement of an initiator piston device that opens the first transfer member at the juncture of the two transfer member sections. When this occurs, fluid flow is achieved between the two transfer member sections and damping fluid can move from one side of the piston head to the other side.

In a preferred embodiment as well, the control assembly includes a temperature compensation assembly. The temperature compensation assembly includes a reservoir for holding damping fluid. The reservoir has particular applicability in receiving and holding damping fluid from the housing chamber due to temperature changes in the damping fluid. For example, when the temperature that the damping fluid is subject to increases, it is necessary to accommodate the increase in volume occupied by the damping fluid at a higher temperature. For proper operation of the control assembly, in connection with the operation of the temperature compensation assembly, a valve is disposed intermediate ends of a conduit or fluid line that is used in interconnecting the housing chamber and the reservoir. The valve enables damping fluid to pass or flow between the housing chamber and the reservoir when the control assembly is unactivated. However, when activated, the valve shuts off or closes so that the path for damping fluid relative to the reservoir is no longer available. When the embodiment of the piston head having no bore is employed, there are two conduits, on opposite sides of the piston head, to provide fluid communication between their associated portions of the housing chamber and the reservoir.

With respect to operation of the control assembly, when there is a front end collision, the seat back moves in a direction from the rear of the vehicle to the front of the vehicle. The seat back movement assembly, which is operably connected thereto, in one embodiment, causes relative movement between parts of the piston assembly. According to one embodiment, the relative movement is between the housing and the piston head/shaft combination of the piston assembly. Such relative movement can be in the form of the housing moving relative to the piston head/shaft or movement of the piston head/shaft while the housing remains stationary. Although the following description is essentially directed to movement of the housing relative to the piston head/shaft, it should be appreciated that the discussion has applicability to an embodiment in which the piston head/shaft move relative to the housing.

The degree, amount and/or rate of relative movement of the housing is a function of the movement of the damping fluid. The greater in number and/or size of damping fluid pathways relative to the housing chamber, the less damping occurs. Conversely stated, the smaller the total volume of damping fluid pathways relative to the housing chamber, the more damping occurs. Assuming for example that the piston head includes one bore and the first initiator assembly has been activated to change the juncture associated with the first initiator assembly from its closed state to its open state, damping fluid is caused to move from the first side of the piston head to its second side through the bore. Continuing with this example and at the same time, damping fluid is also caused to move from the housing chamber in the first direction. This damping fluid moves along, among other possible additional paths, the first and second transfer member sections to the portions of the housing chamber adjacent to the second side of the piston head. As can be appreciated, as the damping fluid moves out of the housing chamber portions adjacent to the first side of the piston head, the piston head is able to move at the predetermined or desired rate in the first direction thereby providing suitable damping of the seat back. As a variation to this example, if the first initiator assembly were not activated but there is a bore in the piston head, piston head movement would be at a lower rate or slower pace, thereby increasing the damping of the seat back.

With regard to a rear end collision, the seat back tends to move towards the back of the vehicle. Consequently, the housing would then move in a second direction, opposite the first direction relative to the piston head and shaft. Depending on the number of initiator assemblies that are activated, as well as the presence or absence of one or more bores in the piston head, a desired damping of the seat back can be accomplished.

Based on the foregoing summary, a number of salient features of the present invention are readily discerned. A control assembly is provided for controlling seat back movement to a desired or predetermined degree. The control assembly is particularly characterized by regulating the flow of damping fluid relative to opposing sides of a piston head. The damping fluid movement is especially controlled by one or more initiator assemblies, which can be selectively activated. One or more bores formed in a piston head can also be utilized in controlling the damping operation. The control assembly can include a temperature compensation assembly that functions to accommodate changes in temperature of the damping fluid. The control assembly constitutes a straightforward and effective design for damping movement of the vehicle seat. The control assembly has a reduced number of parts, can be assembled in an uncomplicated manner and can be provided at a relatively low cost. Additional advantages of the present invention will be come readily apparent from the following discussion, particularly when taken together with the accompanying drawing figures.

DETAILED DESCRIPTION

Figure 1:
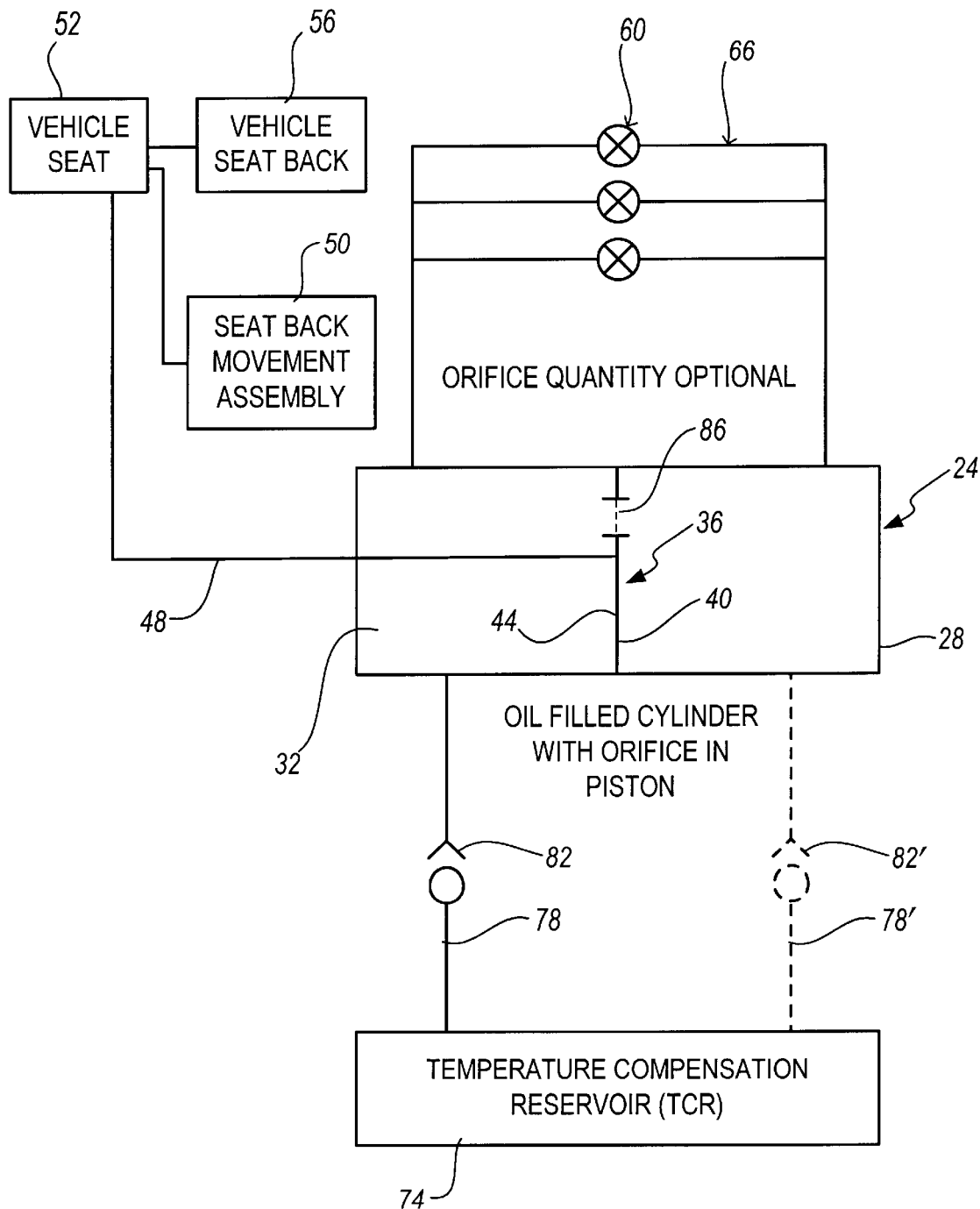
FIG. 1 is a block diagram of the control assembly of the present invention.

With reference to FIG. 1, a control assembly 20 for use in controlling movement of a seat back in a vehicle is illustrated in a block diagram. FIG. 1 represents major units or components of the preferred embodiment of the control assembly 20. A piston assembly 24 comprises a housing 28 having an interior or chamber 32. A piston head 36 is disposed in the chamber 32. The piston head has a first side 40 and a second, opposite side 44. The housing 28 is operably connected to a seat back movement assembly 50. A shaft 48 is connected to the second side 44 of the piston head 36. The shaft 48 has a length that extends outside of the housing 28 for connection to a vehicle seat 52. As can be appreciated, the shaft 48 can be directly connected to the vehicle seat 52 or, alternatively, can be connected thereto by one or more linkages. Likewise, the housing 28 can be directly connected to the seat back movement assembly 50 or could be connected using one or more mechanical links. The seat back movement assembly 50 constitutes the hardware to which the vehicle seat back 56 is operably connected so that control of movement of the seat back movement assembly 50 is applied to the vehicle seat back 56. The seat back movement assembly 50 can be comprised of one of many different designs, with each such design being able to work properly with the control assembly 20 in connection with its damping operation.

The control assembly 20 also includes one or more initiator assemblies 60. Each of the initiator assemblies is operably connected to a transfer assembly 66. Each initiator assembly 60 cooperates with the transfer assembly 66 in order to control the flow of damping fluid relative to the sides 40,44 of the piston head 36, when the initiator assembly 60 is activated.

The control assembly 20 also preferably includes a temperature compensation assembly 70. The temperature compensation assembly 70 is used in accommodating volume changes in the damping fluid due to temperature changes. The temperature compensation assembly 70 includes a reservoir 74 for containing damping fluid. The reservoir fluidly communicates with at least a first portion of the chamber 32 using the conduit or fluid line 78. According to this embodiment, the first portion of the chamber 32 can be defined as being more adjacent to the second side 44 of the piston head than it is to the first side 40 of the piston head 36. Intermediate the ends of the fluid line 78 is a check valve 82. The check valve 82 allows damping fluid to flow to the reservoir 74 from the chamber 32 in its normally open state or position. For example, when the damping fluid is subject to a relatively greater temperature, it expands and the increased volume in the damping fluid due to such a temperature change is accommodated by passage of damping fluid along the fluid line 78 through the check valve 82 to the reservoir 74.

In one embodiment, the piston assembly 24 includes a piston head 36 having a bore or through hole 86 formed through it so that constant fluid communication exists between the opposing sides 40, 44 of the piston head 36. The bore 86 acts as an additional flow path for damping fluid during operation of the control assembly 20, which operation involves, in one embodiment, movement of the housing 28 in a determined one of two directions relative to the piston head 36 and the shaft 48. In an alternative embodiment, there is no bore 86. This alternative embodiment is illustrated by the phantom lines including those bridging the bore 86. When one or more such bores 86 are present, fluid communication with the reservoir 74 can be accomplished from only one side of the piston head 36. However, when no such bore 86 exists in the piston head 36, an additional fluid communication path must be made with the reservoir 74 so that fluid communications are established on both sides 40, 44 of the piston head 36. As illustrated in FIG. 1 using phantom lines for the embodiment in which there is no bore 86, this additional communication is provided by a further fluid 78' line and check valve 82' between a second or opposite portion of the chamber 32 and the reservoir 74. Hence, in the embodiment in which there is no bore 86 in the piston head 36, any changes in damping fluid volume can be handled on both sides of the piston head 36.

Figure 3:
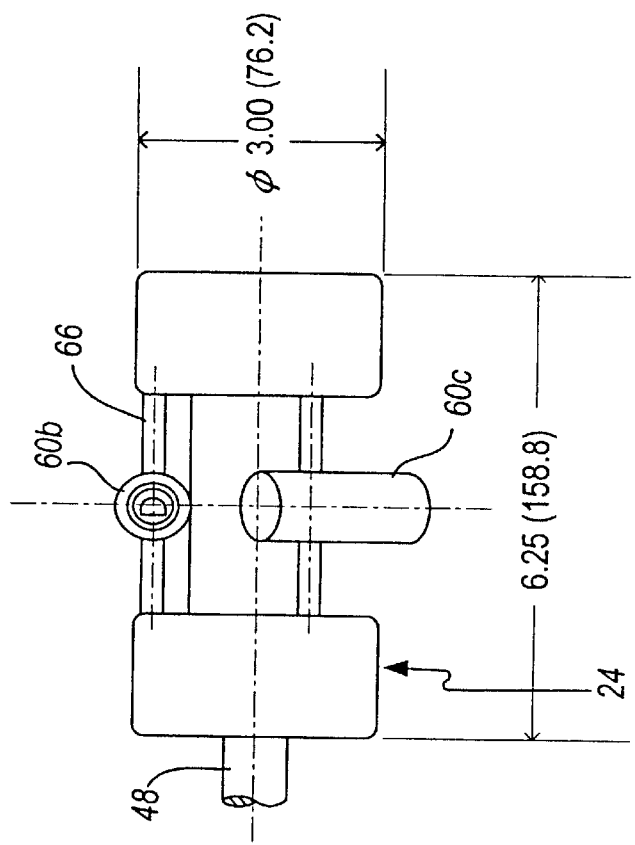
FIG. 3 is a side view of the control assembly.
Figure 2:
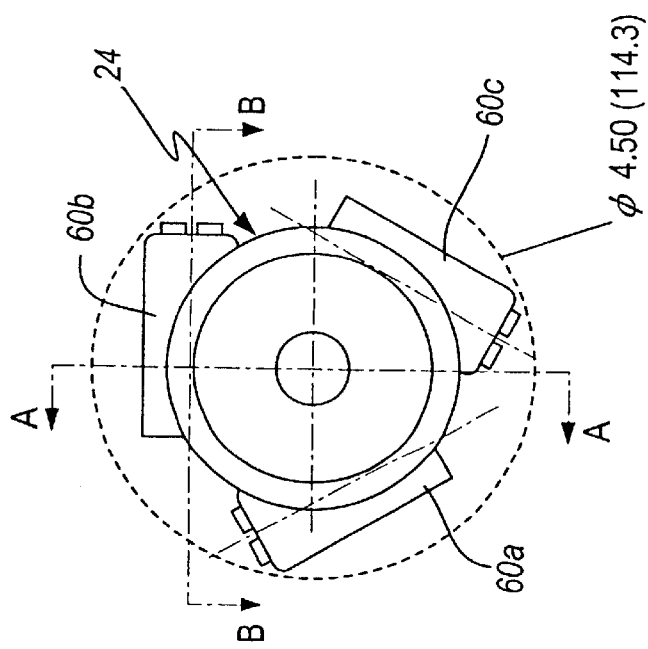
FIG. 2 is an end view of the control assembly illustrating a number of initiator assemblies.

With reference to FIGS. 2–5, more descriptions are provided directed to the piston assembly 24, the initiator assembly or assemblies 60 and the transfer assembly 66. In one embodiment, as seen in FIGS. 2 and 3, the control assembly 20 includes a plurality of initiator assemblies 60 such as the initiator assemblies 60*a*, 60*b*, 60*c*. These initiator assemblies 60 are typically identical in structure and operation, but are positioned at different locations relative to the piston assembly 24 and the transfer assembly 66. In this embodiment, three initiator assemblies 60 are available for activation, although a fewer or greater number of initiator assemblies 60 could be part of the control assembly 20. Each initiator assembly 60 can be independently activated. Selective activation thereof can be accomplished using a vehicle control system 62. The vehicle control system 62 can include, as is known to those of ordinary skill in the art, one or more sensors or detectors 64 useful in determining the presence of a vehicle event, such as a front end or a rear end collision, which is relied on in ultimately triggering one or more of the initiator assemblies 60. In that regard, each initiator assembly 60 electrically communicates with such a vehicle control system 62. Upon determination made by the vehicle control system, an electric signal can be sent to the one or more initiator assemblies 60 for activating each such initiator assembly 60 that receives the electrical triggering signal. A determination is made using the vehicle control system 62 related to the degree of damping that the vehicle seat back 56 is to be subject to or receive. In accordance with one embodiment, greater damping is accomplished by activating fewer initiator assemblies 60, while lesser damping is accomplished by activating more initiator assemblies 60. Generally, with this embodiment, activating more of the initiator assemblies 60, such as all three of them in the illustrated embodiment of FIG. 2, results in more paths or passageways being used to carry damping fluid relative to opposing sides 40, 44 of the piston head 36. Such paths have desired or predetermined sizes through which the damping fluid moves.

Figure 4:
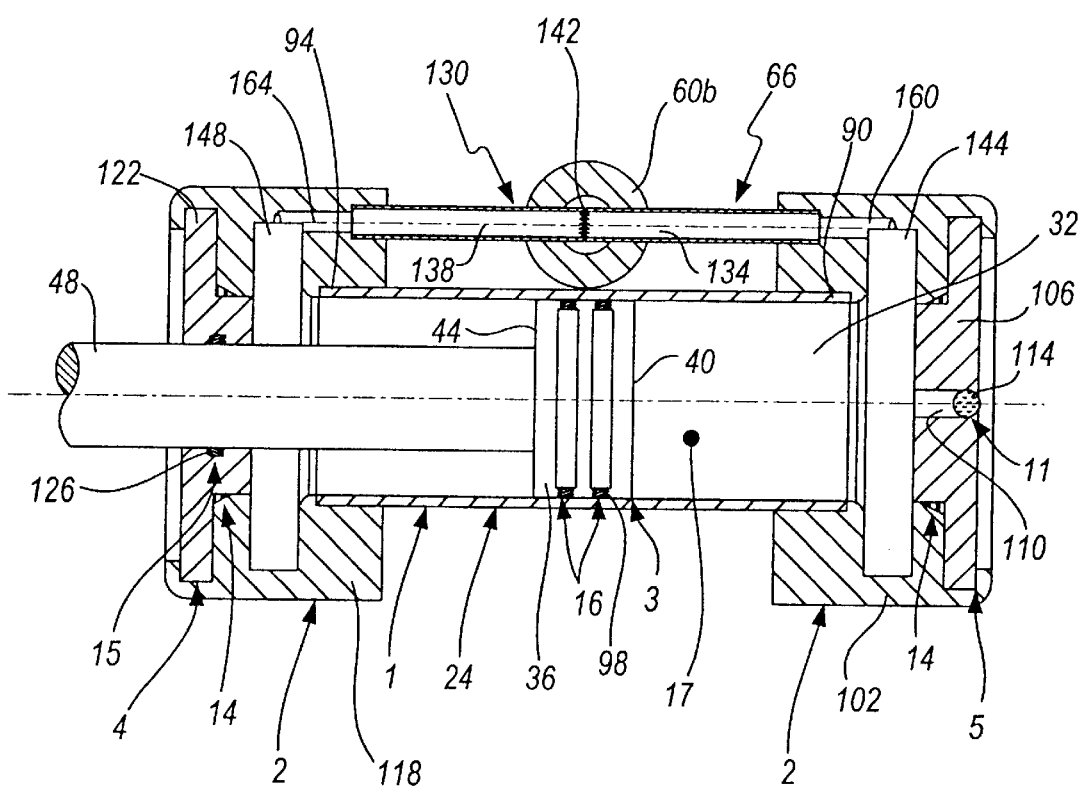
FIG. 4 is a longitudinal cross-section of the control assembly.

With reference to FIG. 4, more specific implementation details of the piston assembly 24 and the transfer assembly 66 are provided. The housing 28 of the piston assembly 24 has a first end portion 90 and a second end portion 94 located at opposite ends thereof. The piston head 36 has a thickness defined between its first side 40 and its second side 44. The damping fluid is held in the chamber 32 on both sides of the piston head 36 and with the damping fluid being in contact with both sides 40, 44. This embodiment is illustrated as having no bore 86 through the thickness of the piston head 36, although such a bore 86 could be included as discussed in connection with FIG. 1. The piston head 36 can have one or more sealing members or O-rings 98 located about its circumferential periphery. The sealing ring or rings 98 are useful in preventing damping fluid flow between the inner wall of the housing 28 and the outer circumferential periphery of the piston head 36. Such sealing may not be particularly necessary in the embodiment in which the bore 86 is provided through the piston head 36, although any such damping fluid flow between the inner wall of the housing 28 and the outer surface of the piston head 36 might have to be considered in determining proper damping (desired damping fluid movement) when a predetermined vehicle collision occurs. With respect to the damping action and damping fluid movement, relative movement occurs between the end portions 90, 94 of the housing 28 and the piston head 36. In accordance with one embodiment, a first direction of housing 28 movement can be defined as the first end portions 90 of the housing 28 moving towards the piston head 36. A second direction can be defined as movement of the second end portions 94 of the housing 28 moving towards the piston head 36. It can be further defined that, when the housing 28 is moving in the first direction, the vehicle seat back 56 is moving towards the front of the vehicle due to a front end collision, for example. When the housing 28 is moving in the second direction, the vehicle seat back 56 is moving away from the front of the vehicle, for example, due to a rear end collision. More specifically, when a front end collision occurs, the seat back movement assembly 50 applies a force, directly or indirectly through appropriate linkages, to the housing 28, thereby pushing the housing 28 including the first end portions 90 in the first direction. Conversely, when a rear end collision occurs, the seat back movement assembly 50 moves in an opposite direction exerting a pulling force on the housing 28, thereby causing movement thereof in the second direction.

Joined to the first end portions 90 in this embodiment, is a first end cap 102. The first end cap 102 has a cavity for receiving a first end plug 106. The first end plug 106 has a filler channel 110 for use in filling the chamber 32 with damping fluid. A fill plug 114 is used to seal the filler channel 110 after the chamber 32 has been filled with damping fluid. Similarly, a second end cap 118 is joined to the second end portions 94 of the housing 28. This second end cap 118 also has a cavity into which a second end plug 124 is positioned. The second end plug 122 has an opening to receive portions of the moveable shaft 48. A sealing member or O-ring is located in recessed annular portions of the second end cap 122 for providing a seal that prevents leakage of damping fluid along the circumferential periphery of the shaft 48.

The transfer assembly 66 is used in carrying damping fluid relative to opposing sides of the chamber 32, which are defined by one of the two sides 40, 44 of the piston head 36. When the housing 28 is moving in the first direction (first end portions 90 towards the piston head 36), the transfer assembly 60 can be used to carry damping fluid from the chamber portion adjacent to the first side 40 of the piston head 36 to the chamber portion adjacent to the second side 44 of the piston head 36. On the other hand, when the housing 28 is moving in the second direction, the transfer assembly 66 can be used to carry damping fluid in the opposite direction towards the chamber portion adjacent to the first side 40 of the piston head 36.

In the preferred embodiment, the transfer assembly 66 includes one or more transfer members 130. The number of transfer members 130 corresponds to the number of initiator assemblies 60. Each transfer member 130 can have first and second transfer member sections 134, 138. A juncture 142 is associated with each transfer member 130. In particular, the juncture 142 is defined as an interface or interconnection between the two transfer member sections 134, 138. Each juncture 142 is operably aligned or otherwise associated with one of the initiator assemblies 60. In the illustrated embodiment of FIG. 4, the juncture 142 is normally closed. That is, when the initiator assembly 60*b* is unactivated, damping fluid cannot pass through the juncture 142 and between the first and second transfer member sections 134, 138. More specifically, before activation of the initiator assembly 60*b*, each of the ends of the transfer member sections 134, 138 at the juncture 142 are blocked or closed so that fluid cannot pass between these two transfer member sections 134, 138.

With continued reference to FIG. 4, the transfer assembly 66 also includes a first common passageway or manifold 144 adjacent to the first end portions 90 of the piston housing 28. Likewise, a second common passageway or manifold 148 is provided or defined adjacent to the second end portions 94 of the housing 28. The first common passageway 144 is in fluid communication with the first transfer member section 134 by means of a first intermediate or linking fluid channel 160, which can be formed in a first end cap 102. The second common passageway 148 is in fluid communication with the second transfer member section 138 by means of a second intermediate or linking fluid channel 164, which can be formed in the second end cap 118. As can be understood, when there is more than one transfer member 130, there are corresponding first and second linking fluid channels 160, 164 for each such transfer member 130. For each of these further linking fluid channels 160, 164, the first and second common passageways 144, 148, respectively, are in fluid communication therewith.

Figure 5:
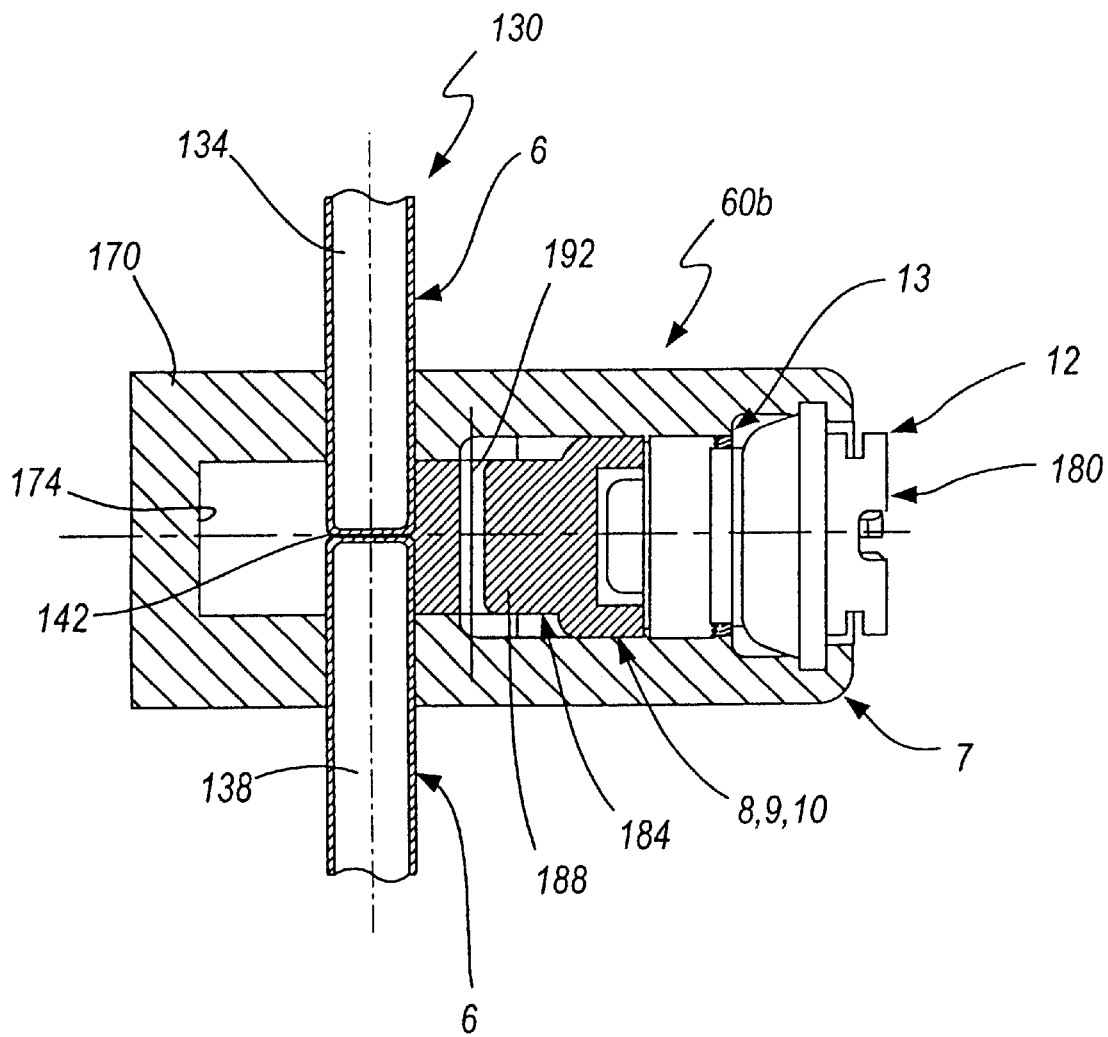
FIG. 5 is a longitudinal cross-sectional view of the initiator assembly, together with portions of a transfer member including the juncture between transfer member sections.

Referring to FIG. 5, an additional illustration is provided related to the arrangement and relationship between the initiator assembly 60b and the transfer member 130, which can apply to each and any other initiator assembly 60 and its associated transfer member 130. Specifically, the initiator assembly 60*b* includes an initiator housing 170 having a cavity 174. An initiator unit 180 is held in the cavity 174 at end of the initiator housing 170. The initiator unit 180 can be the same as one or more of numerous initiator units that are commonly used as part of inflators that, when activated, are used to fill an air bag with one or more inflatable gases. In one embodiment, the initiator unit 180 is based on the disclosures in U.S. Pat. No. 5,404,263 issued Apr. 4, 1995 entitled "All-Glass Header Assembly Used in an Inflator System" and which is assigned to the same assignee as the present application.

The initiator unit 180 includes one or conducting pins. At least one pin receives an electrical signal when the initiator unit 180 is to be triggered. Once triggered, an explosive charge is ignited. The force of the explosive charge is used in controlling the state of the transfer member 130. In particular, the initiator assembly 60*b* also includes a piston device 184. The piston device 184 is disposed in the cavity 174 adjacent to the initiator unit 180. The piston device 184 includes a piston body 188 and a piston linking path 192 formed through the width of the piston body 184. As illustrated in FIG. 5, the piston linking path 192 can have a smaller width or diameter than the diameter or width of the first and second transfer member sections 134, 138. When the initiator assembly 60*b*, particularly the initiator unit 180, is activated, the explosive charge causes the piston device 184 to move away from the initiator unit 180 and open, or change the closed state of, the juncture 142. The piston device 184 moves through the walls of the first and second transfer member sections 134, 138 at the juncture 142 and opens the previously closed ends of these transfer member sections 134, 138. After completion of its movement, the fluid linking path 192 is disposed within the transfer member 130 and extends between the transfer member sections 134, 138. Hence, the fluid linking path 192 provides a conduit for damping fluid between these two transfer member sections 134, 138.

In an alternative embodiment, instead of the transfer member 130 being in a normally closed state in which there is no fluid communication between the two transfer member sections 134, 138, the transfer member 130 could be in a normally open state. The control assembly 20 is then designed to function so that, for example, the piston device 184 closes off or does not permit fluid flow between the first and second transfer member sections 134, 138 after activation of an initiator assembly. That is, the piston device 184 would act to block or interrupt any damping fluid flow that might have existed before activation of the initiator assembly 60.

Figure 6:
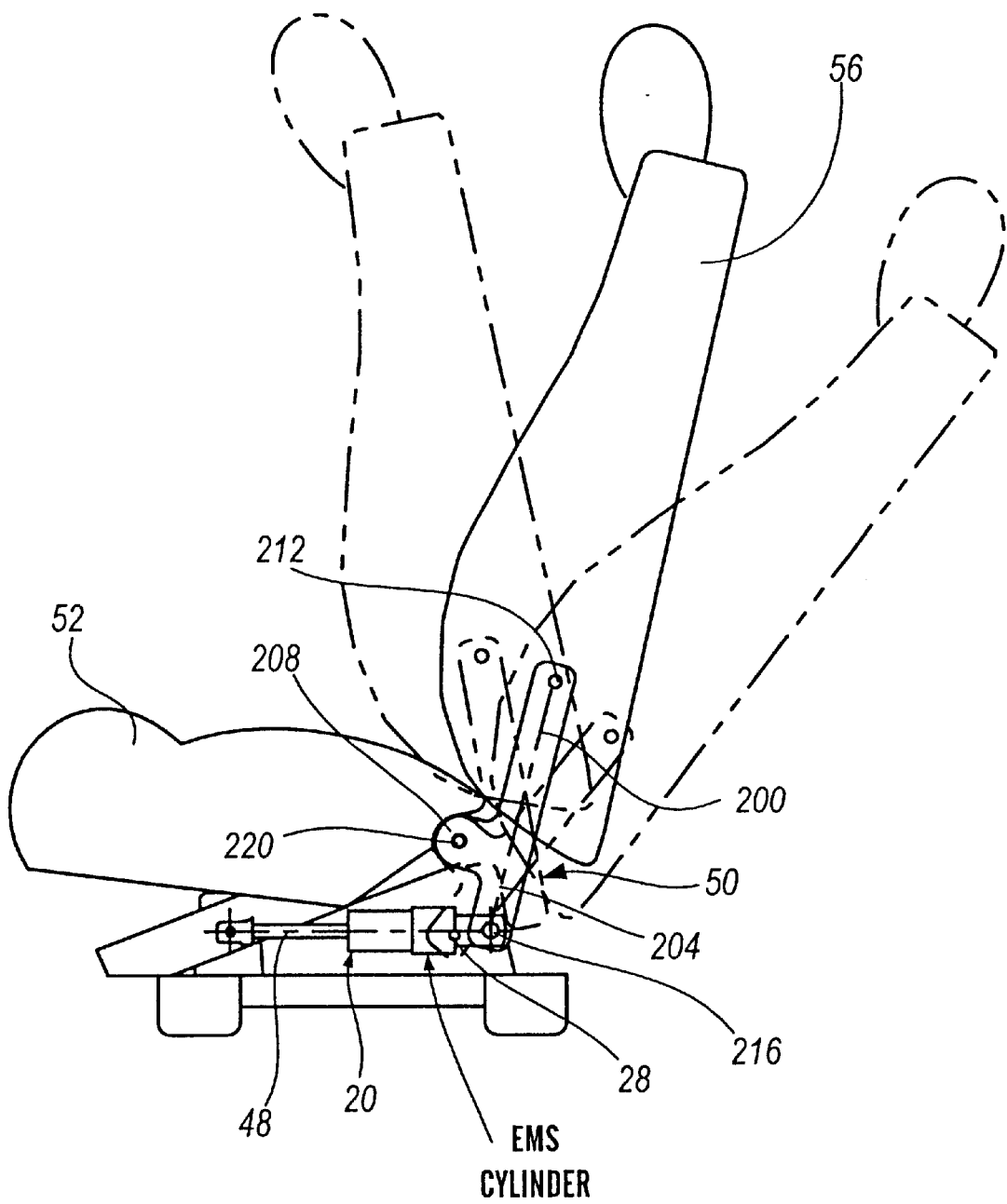
FIG. 6 is a diagrammatic illustration of one embodiment of a combination of control assembly, seat back movement assembly, seat and seat back.

Referring to FIG. 6, the control assembly 20 is illustrated as being connected to a vehicle seat 52 and a seat back movement assembly 50. More particularly, the shaft 48 of the piston assembly is connected to a member or linkage, which is fixedly joined to the seat 52. In this embodiment, when a front end collision or a rear-end collision occurs, this linkage or connecting member is essentially stationary or does not move. The opposite end of the control assembly 20, which can be defined as part of the housing 28, is connected to the seat back movement assembly 50. In this embodiment, the seat back movement assembly 50 includes a bracket having an upper leg or portion 200, a lower leg or portion 204 and an intermediate leg or portion 208. The upper leg 200 of the bracket is connected at connecting point 212 to the seat back 56. The lower leg 204 of the bracket is connected to the housing 28 of the control assembly 20 at the connecting point 216. The bracket is connected to the seat 52 using the intermediate leg or portion at the pivotal connecting point 220.

According to this embodiment, when a front end collision occurs, the seat back 56 moves towards the front of the vehicle (towards the left in FIG. 6). That is, the seat back 56 pivots or rotates in a counter-clockwise direction about the pivotal connecting point 220. As the seat back 56 moves in a counter-clockwise direction, through the lower leg connecting point 216, the housing 28 is moved or caused to be pushed towards the left relative to the stationary piston shaft 48.

When a rear end collision occurs, the seat back 56 moves toward the right in FIG. 6, in a clockwise direction about the pivotal connecting point 220. When this occurs, the housing 28 of the control system 20 is moved or pulled towards the right including relative to the piston shaft 48.

Regarding the operation of the control assembly 20, further descriptions are provided in the context of representative examples. Assuming first that the piston head 36 has a bore 86 and a determination is made by the vehicle control system 62, based on information associated with a particular vehicle collision, that no initiator assembly 60 is to be activated. In such a case, housing 28 movement in the resulting direction, dependent upon the type of collision (e.g., front end or a rear end), causes damping fluid to move relative to the sides 40, 44 of the piston head 36 through the bore 86. Since, in this example, no initiator assembly 60 was activated, this constitutes the greatest degree or amount of damping of the vehicle seat back 56. Assuming further as a variant that one initiator assembly 60 has been triggered, a further fluid passageway is created through the transfer member sections 134, 138 relative to the sides 40, 44 of the piston head 36. Hence, less damping is achieved in that situation due to more space or volume for damping fluid to move between the sides 40, 44 of the piston head 36. As a further variance, when there is more than one initiator assembly 60 and associated transfer member 130, when more than one such initiator assembly 60 is fired, additional one or more passages are created to carry the damping fluid from one piston side to the other.

In connection with describing more details related to the operation of the control assembly 20, and assuming a front end vehicle collision in which the vehicle control system 62 activates only one initiator assembly 60b and the piston head 36 has a bore 86, the seat back movement assembly 52 applies a force to the housing 28 pushing it, in the first direction towards the first side 40 of the piston head 36. As a result, damping fluid moves in the first direction from adjacent the first side 40 of the piston head 36 through the bore 86 to the second side 44. Additionally, damping fluid moves from the chamber portion adjacent to the first side 40 of the piston head 36 to the first common passageway 144 into the first fluid linking member 160, along the first transfer member section 134, through the juncture 142 using the fluid linking channel 192 in the piston device 184, along the second transfer member section 138, through the second fluid linking path 164 and into the second common passageway 148. Such damping fluid then passes into the chamber portion adjacent to the second side 44 of the piston head 36. The movement of the damping fluid contributes to the desired or predetermined damping of the vehicle seat back 56, as determined by the vehicle control system to which the control assembly 20 responds.

Assuming, conversely, that a rear end collision has occurred and that the vehicle control system 62 has determined that proper or sufficient damping occurs if only the initiator assembly 60b is fired, damping fluid moves away from the chamber portion adjacent to the second side 44 of the piston head 36 and towards the chamber portion associated with the first side 40 thereof. More particularly, in this next example, damping fluid flows in the second direction through the bore 86 from the first side 40 to the second side 44 of the piston head 36. From there, the damping fluid moves into the second common passageway 148, through the second fluid linking path 164, along the second transfer member section 138, through the piston linking path 192 at the juncture 142, along the first transfer member section 134, into the first fluid linking path 160, then into the first common passageway 144, and from there the damping fluid passes into the chamber portion adjacent the first side 40 of the piston head 36. Accordingly, the control assembly 20 dampens movement of the vehicle seat back 56 due to the rear end collision by such movement of the damping fluid and the movement of the housing 28 in the second direction.

The foregoing discussion of the invention has been presented for purposes of illustration and description. Further, the description is not intended to limit the invention to the form disclosed herein. Consequently, further variations and modifications commensurate with the above teachings, within the skill and knowledge of the relevant art, are within the scope of the present invention. The embodiments described hereinabove are further intended to explain the best modes presently known for practicing the invention and to enable others skilled in the art to utilize the invention in such, and other embodiments, and with the various modifications required by the particular application or uses of the invention. It is intended that the appended claims be construed to include alternative embodiments to the extent permitted by the prior art.

What is claimed is:

1. An apparatus for use in controlling a seat back movement assembly located in a vehicle having a vehicle control system, comprising:

a control assembly operatively responsive to the vehicle control system and connected to the seat back movement assembly for regulating movement thereof, said control assembly including a piston head with first and second opposing sides and also having a bore, damping fluid and at least a first initiator assembly having an initiator charge that is ignited when at least a first predetermined event occurs related to a vehicle collision, said bore for allowing at least some of said damping fluid to move relative to said first and second opposing sides, wherein when said initiator charge is ignited a first degree of damping is provided to the seat back movement assembly and when a second predetermined event occurs related to a vehicle collision and said initiator charge remains unignited, a second degree of damping is provided to the seat back movement assembly.

2. The apparatus, as claimed in claim 1, wherein:

said piston head is part of a piston assembly including a housing having a chamber, said damping fluid contacting each of said two opposing sides.

3. The apparatus, as claimed in claim 2, wherein:

said piston assembly includes a sealing member disposed about a periphery of said piston head such that movement of said damping fluid past said sealing member is substantially prevented.

4. The apparatus, as claimed in claim 2, wherein:

said control assembly comprises a transfer assembly that includes at least a first transfer member that carries said damping fluid to at least one of said first and second opposing sides.

5. The apparatus, as claimed in claim 2, wherein:

at least portions of said piston assembly are moveable in each of a first direction and a second direction, with movement in a determined one of said first direction and said second direction depending on the vehicle collision.

6. The apparatus, as claimed in claim 1, wherein:

said control assembly includes a housing having a housing chamber holding said damping fluid and a transfer assembly having at least a first transfer member and at least a first common passageway in communication with said housing chamber, wherein said damping fluid can move from said housing chamber to said transfer member using said common passageway.

7. The apparatus, as claimed in claim 1, wherein:

said control assembly includes at least a first transfer member comprising first and second transfer member sections and a transfer junction therebetween, said at least a first initiator assembly being located adjacent to said transfer junction, said transfer junction being associated with first and second states, when said transfer junction is in said first state, said damping fluid can pass between said first and second transfer member sections and, when said transfer junction is in said second state, said damping fluid cannot pass between said first and second transfer member sections.

8. The apparatus, as claimed in claim 7, wherein:

said control assembly further includes a second initiator assembly operatively associated with a second transfer member, said second transfer member having third and fourth transfer member sections with said second initiator assembly being located at a second transfer junction between said third and fourth transfer member sections.

9. The apparatus, as claimed in claim 1, wherein said control assembly includes:

a housing having a chamber holding said a damping fluid;

a piston shaft connected to said piston head, said piston head being disposed in said chamber and said damping fluid being disposed on each of said first and second sides of said piston head;

at least a first cap member connected to said housing, said first cap member having a common passageway in communication with said chamber; and a transfer assembly operatively connected to said first cap member, said transfer assembly including at least a first transfer member that carries said damping fluid relative to said first and second opposing sides of said piston head using said common passageway.

10. The apparatus, as claimed in claim 1, further including:

a temperature compensation assembly for accommodating changes in temperature of said damping fluid.

11. The apparatus, as claimed in claim 10, wherein:

said control assembly includes a housing and a chamber and said temperature compensation assembly includes a reservoir in communication with said chamber and a valve that allows fluid flow relative to said reservoir.

12. A method for use in controlling a seat back movement assembly in a vehicle having a vehicle control system, comprising:

providing a control assembly responsive to the vehicle control system and operatively connected to the seat back movement assembly, said control assembly including a housing having a chamber, a piston head having first and second opposing sides, damping fluid and at least a first initiator assembly having an initiator charge;

providing a first check valve, a second check valve, and a reservoir, said chamber having a first chamber portion on said first side of said piston head and a second chamber portion on said second side of said piston head, said first check valve being able to pass damping fluid from said first chamber portion but not from said second chamber portion to said reservoir and said second check valve being able to pass damping fluid from said second chamber portion but not from said first chamber portion to said reservoir;

determining using the vehicle control system that a vehicle collision has occurred and said initiator charge of said first initiator assembly is to remain unignited; and regulating movement of the seat back movement assembly using said control assembly, wherein a first degree of damping to the seat back movement assembly is provided;

wherein if said initiator charge of said at least said first initiator assembly is ignited, a second degree of damping to the seat back movement assembly is provided.

13. The method, as claimed in claim 12, wherein:

said control assembly includes a said chamber containing said damping fluid and a transfer assembly operatively connected to said housing, said regulating step includes moving said damping fluid relative to said chamber using said transfer assembly.

14. The method, as claimed in claim 12, wherein:

said transfer assembly includes at least a first transfer member having a transfer junction to define first and second transfer member sections, said at least a first initiator assembly being located adjacent to said transfer junction, said transfer junction having first and second states and said regulating step includes igniting said initiator charge of said first initiator assembly to change said transfer junction from said first state to said second state.

15. The method, as claimed in claim 12, wherein:

said control assembly includes a second initiator assembly having an initiator charge and in which said regulating step includes activating each of said first and second initiator assemblies.

16. The method, as claimed in claim 12, wherein:

said control assembly includes a piston assembly having said piston head and also includes said chamber containing said damping fluid related to at least said first degree of damping and with said piston head being disposed in said chamber, said damping fluid contacting each of said first and second opposing sides of said piston head, said regulating step includes moving said damping fluid relative to said chamber.

17. The method, as claimed in claim 16, wherein:

said moving step includes moving one of said housing and said piston head in a first direction when the vehicle collision involves a front end collision and moving one of said housing and said piston head in a second direction when the vehicle collision involves a rear end collision.

18. The method, as claimed in claim 12, wherein:

said control assembly includes at least a first transfer member comprising first and second transfer member sections and with a junction being defined between said first and second transfer member sections, said junction being associated with a first state and a second state related to movement of said damping fluid related to at least said first degree of damping, said regulating step includes changing said junction from being associated with said first state to being associated with said second state depending on the vehicle collision.

19. The method, as claimed in claim 12, wherein:

said regulating step further includes igniting said initiator charge of said first initiator assembly.

20. The method, as claimed in claim 12, wherein:

said control assembly includes a second initiator assembly having an initiator charge, a transfer assembly including first and second transfer members, said first initiator assembly being operatively connected to said first transfer member and said second initiator assembly being operatively connected to said second transfer member, said regulating step includes igniting said initiator charge of each of said first and second initiator assemblies and causing movement of said damping fluid relative to each of said first and second transfer members.

21. The method as claimed in claim 12, wherein:

said providing step includes providing a temperature compensation assembly including said reservoir, said control assembly including a housing having a chamber and in which movement of said damping fluid related to at least said first degree of damping is allowed between said chamber and said reservoir due to temperature changes in said damping fluid.

22. The method, as claimed in claim 21, wherein:

said temperature compensation assembly includes a valve located between said chamber and said reservoir in which said valve allows movement of said damping fluid between said reservoir and said chamber.

* * * * *